United States Patent

Lewin et al.

[11] Patent Number: 5,916,704
[45] Date of Patent: Jun. 29, 1999

[54] LOW PRESSURE BATTERY VENT

[75] Inventors: Stanley Lewin, New Rochelle; Mark Cholach, Webster, both of N.Y.

[73] Assignee: Ultralife Batteries, Newark, N.Y.

[21] Appl. No.: 08/948,513

[22] Filed: Oct. 10, 1997

[51] Int. Cl.$^6$ .............................. H01M 2/08; H01M 2/12
[52] U.S. Cl. .............................. 429/54; 429/82; 429/127; 429/185
[58] Field of Search ...................................... 429/162, 163, 429/127, 53, 54, 72, 82, 57, 174, 185

[56] References Cited

U.S. PATENT DOCUMENTS

| | | | |
|---|---|---|---|
| 3,375,136 | 3/1968 | Biggar | 429/127 |
| 4,664,994 | 5/1987 | Koike et al. | 429/163 |
| 4,732,825 | 3/1988 | Kamata et al. | 429/162 |
| 5,004,655 | 4/1991 | Symanski | 429/82 |

*Primary Examiner*—Anthony Skapars
*Attorney, Agent, or Firm*—Graham & James LLP

[57] ABSTRACT

A low pressure vented battery structure comprised of lithium ion polymer cells contained within a flexible container. The flexible container is punctured to provide a venting aperture. The venting aperture is externally sealingly covered with a vent structure comprising a first chemically inert plastic film layer having a central aperture which is adhered to the flexible container around the periphery of the central aperture, with the central aperture being in registration with the venting aperture. A second film chemically inert layer membrane is partially adhered to the first layer, whereby the membrane is stretched and anchored in a position covering the central aperture and the venting aperture, and partially separated from the first layer to provide a venting pathway from the venting aperture to the ambient atmosphere. The second film layer is releasably sealed to the first layer, at the position of partial separation, by a releasable sealing material of sufficient strength to maintain a seal under equalized internal and external pressure conditions and normal handling of the cell or battery. The sealing material is released from maintaining sealed engagement between the first and second film layers seal with the second film layer separating from the first under a predetermined low pressure value whereby the excess low pressure is atmospherically vented between the first and second film layers. The film layers further comprise reseating means for reseating and resealing the venting aperture after venting of the excess low pressure is completed.

8 Claims, 1 Drawing Sheet

LOW PRESSURE BATTERY VENT

FIELD OF THE INVENTION

This invention relates to low pressure venting of batteries contained within flexible containers and particularly to lithium ion polymer batteries contained in flexible foil packages and subject to small internal gassing resulting from cell impurities.

BACKGROUND OF THE INVENTION

Vents for batteries have generally been included in batteries having containers of substantially structural integrity. Thus, alkaline cells and cells having pressurized components have generally been constructed in metallic cylindrical containers which are capable of withstanding excessive high build-ups and which containers embodied substantial mechanical vents if such internal pressure become sufficiently high to break the intgrity of the seals or walls of the container.

Cells and batteries have been constructed in less rugged containers such as in foil packaging but generally only if the components of the electrochemical system of the individual cells are not detrimentally subject to gassing. Any low pressure gassing in such cells has however been difficult to control while also preventing ambient air and moisture from entering the battery container and in maintaining the integrity thereof. Alternatively, reliable low pressure vents are bulky and not generally suitable for use in thin film battery enclosures such as foil enclosures. In addition, reliable vents have not been economical to manufacture and include in these cells or batteries.

SUMMARY OF THE INVENTION

It is an object of the present invention to provide a non-bulky low pressure sensitive vented battery in a flexible container package.

It is a further object of the present invention to provide such battery with a reliable, economical vent of minimal dimensions in a battery subject to low pressure gas build-up.

Generally the present invention comprises a vented battery structure comprised of one or more cells in containers detrimentally subject to low pressure build-up from the cells (generally on the order of less than one psig), such as lithium ion polymer cells, contained within a flexible enclosure such as a thin foil package enclosure. Impurities such as water contained within the electrolyte or other cell elements tend to cause gassing which, though minimal, may detrimentally inflate the flexible enclosure structure and also, particularly under high temperature use, may cause rupture of the flexible enclosure.

In accordance with the present invention, in order to avoid the detrimental effects of the gassing, the flexible enclosure is minimally punctured to provide a venting aperture. The venting aperture is externally sealed with a bi-layer plastic film vent structure comprising a first layer having a central aperture. This first layer is complete adhered to the flexible enclosure around the periphery of the central aperture, with the central aperture being in registration with the venting aperture. A second film layer is partially adhered to the first layer whereby it is substantially anchored in a position covering the central aperture and the venting aperture. The second layer is partially separated from the first layer to provide a venting pathway between the venting aperture and the ambient atmosphere. The second film layer is releasably sealed to the first layer, at the position of partial separation, by a releasable sealing material of sufficient strength to maintain a seal under substantially equalized internal and external pressure conditions and normal handling of the cell or battery. However, the sealing material is released from maintaining sealed engagement between the first and second film layers seal with the second film layer separating from the first under a predetermined low pressure value whereby the excess low pressure is atmospherically vented between the first and second film layers. The film layers further comprise reseating means for reseating and resealing the venting aperture after venting of the excess low pressure is completed. Both the first and second film layer elements should be chemically compatible with the cell components.

If the flexible container of the battery itself has structural integrity sufficient for it to remain flat, it may be utilized in place of the first film layer. In addition the membrane should be handleable without a substrate carrier as afforded by the first film layer in the embodiment described above. As with the prior embodiment, the container is punctured to provide a venting aperture and this aperture is covered with a stretched membrane which is partially adhered (preferably by adhesive, though other adhering methods are similarly availing such as heat sealing if they do not affect the integrity of the membrane or the container) peripheral to the puncture aperture and wherein the releasable sealant material is directly positioned between the container wall and the membrane to complete the sealing of venting aperture from the ambient atmosphere. The operation and function remain the same.

These and other objects, features and advantages of the present invention will become more evident from the following discussion and drawings in which:

SHORT DESCRIPTION OF THE DRAWINGS

DETAILED DESCRIPTION OF THE INVENTION

In a preferred embodiment of the present invention, silicone, grease, oil or other non-drying sealant is peripherally placed around the central aperture (or between the membrane and its base support) as the releasable sealing material between the film layers of the vent. Depending on the tackiness of the sealant material it is released from adhering the first and second layers under predetermined precise low excessive internal pressure conditions, to vent gas and to immediately reseal to prevent air ingress when the pressure is relieved. The second film layer is in a stretched membrane configuration wherein it snaps back, upon release of venting pressure, to its original sealing contact position.

Prior to use of the vent layers, oil or the other sealant materials is placed between the membrane layer and the base film layer to maintain the seal. With oil, and a typical valve structure such as is commercially available from the Plitek, Inc. for use in coffee packaging, the valve opens when there is a pressure differential of about 0.14 psig (about 9.5 millibar) between internal and external pressure. The valve is sensitive to about 0.04 psig (2.6 millibar) at which point the membrane layer resiliency is able to overcome the residual pressure and resume its original sealing position.

The movable membrane is for example comprises of a thin (on the order of about 5 mils) thick layer of an inert (relative to the cell components) material such as polyester. The tack of the releasable sealant should not however be excessive whereby the membrane is overly stretched to lose its dimensional stability for resealing, nor should the material be too thin or of an elastic composition wherein stretching occurs without sealant release.

DETAILED DESCRIPTION OF THE DRAWINGS AND THE PREFERRED EMBODIMENT

Figure 1:
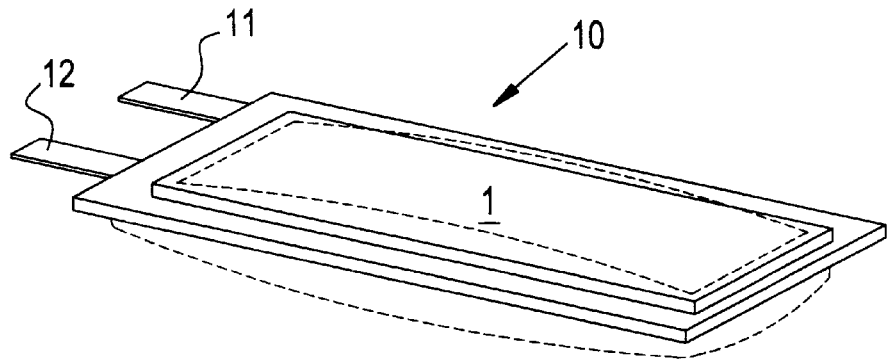
FIG. 1 is an isometric view of a typical battery with a flexible foil container enclosure with dotted lines indicating detrimental inflation caused by low pressure internal gassing.

With reference to the drawings, in FIG. 1 an elongated foil packaged battery 10 is shown with positive and negative terminal tab strips 11 and 12. The battery is contained within sealed foil package container 1 and because of internal gassing assumes the blown up shape shown by the dotted line configuration. Since batteries are normally placed in confined areas, such swelling is detrimental with the real possibility of rupture is too tightly confined.

Figure 2A:
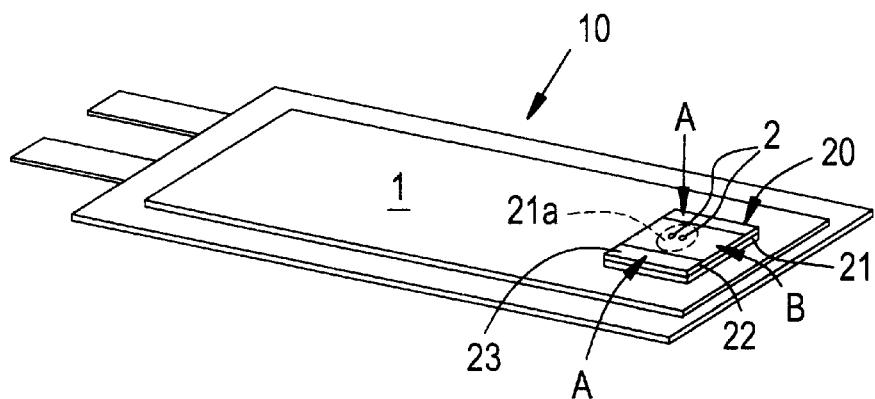
FIG. 2a is an isometric side view of the battery and vent of the present invention in a sealed condition.
Figure 2B:
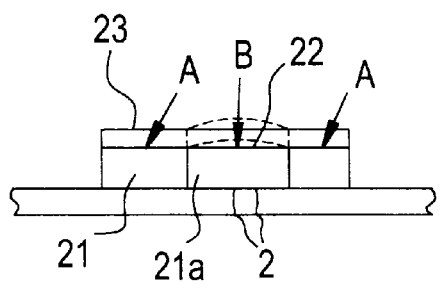
FIG. 2b is an isometric side view of FIG. 2a showing the low pressure venting thereof (in exaggerated form for clarity).

To avoid this, as shown in FIGS. 2a and 2b, foil package container 1 is punctured to form vent aperture 2. In order to prevent ambient air from entering the battery, including detrimental moisture, normally sealed vent element 20 is adhesively affixed to cover the vent aperture. Vent element 20 is comprised of a first film layer 21 having central aperture 21a therein and wherein the central aperture is positioned to contain the vent aperture 2 in full registry therewithin. First film layer 21 is firmly adhered to second membrane layer 23 in areas A but not in areas B, whereby membrane layer 23 covers the central aperture 21a and the vent aperture 2 therebeneath and wherein there is venting access between vent aperture 2 and the ambient atmosphere between layers 21 and 23 in areas B.

Figure 3:
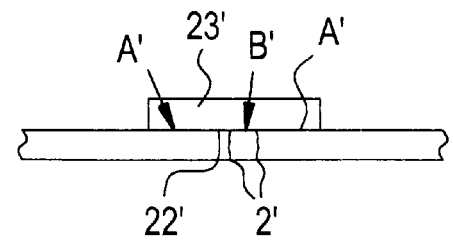
FIG. 3 is a side view of a second embodiment of the vented battery wherein the movable venting membrane is directly adhered to the battery container.

In order to prevent ingress of ambient air, moisture, dirt and the like into the battery via vent aperture 2, releasable sealant material 22, such as oil or silicone is positioned between layers 21 and 23 in area B peripheral to the central aperture 21. As shown in FIG. 3, venting is effected at low excessive internal pressures whereby the pressure is sufficient to overcome the tack of the sealant material 22 whereby layer 23 is moved away from base layer 21 to open venting gap 24 to vent the excessive gas, causing the pressure rise, into the ambient atmosphere. When venting is complete, residual stretch tension in membrane layer 23 causes it to snap back into contact with sealant material 22 whereby the seal is re-established. In FIG. 4 the movable venting membrane 23' is shown as being directly adhered to foil package container 1' to peripherally seal vent aperture 2' by a full adhesive seal at are A' and a releasable seal at area B' by means of releasable sealant 22'.

It is understood that the above disclosure, description and drawings are merely illustrative of the present invention and that details contained therein are not to be construed as limitations on the present invention. Changes in components, materials, placement of elements and the like are possible without departing from the scope of the present invention as defined in the following claims.

What is claimed is:

1. A vented battery structure comprised of one or more cells in a flexible container, with said battery being subject to low pressure build-up therewithin sufficient to distort the flexible container, wherein the flexible container is apertured with a venting aperture and the venting aperture is externally sealingly covered with a bi-layer plastic film vent structure comprising a first layer having a central aperture, said first layer being complete adhered to the flexible container around the periphery of the central aperture, with the central aperture being in registration with the venting aperture and wherein a second film layer is partially adhered to the first layer whereby it is substantially anchored in a position covering the central aperture and the venting aperture and wherein the second film layer is partially separated from the first film layer to thereby provide a venting pathway from the venting aperture to the ambient atmosphere; and wherein the second film layer is releasably sealed to the first film layer, at the position of partial separation, by a releasable sealing material to maintain a seal under substantially equalized internal and external pressure conditions and wherein the sealing material is released from maintaining sealed engagement between the first and second film layers at an internal pressure in excess of the external pressure by at least a pre-set low pressure value whereby the excess low pressure is vented between the the first and second layers and wherein the second film layer comprises reseating means for reseating the second film layer on the sealing material for resealing the venting aperture after venting of the excess low pressure is completed.

2. The vented battery structure of claim 1, wherein the membrane is adhered to one side of an apertured film substrate, with another side of said substrate being sealingly adheringly anchored to the flexible container wherein the venting aperture is positioned in registration within an aperture of the apertured substrate, and wherein the membrane sealingly covers the aperture of the apertured substrate and the venting aperture, wherein the membrane is partially sealingly adhered to the substrate peripheral to the aperture thereof and partially releasably sealed around a remaining periphery of the aperture of the substrate with the sealing material.

3. The vented battery structure of claim 1, wherein the sealing material is selected from the group consisting of silicone, grease and oil.

4. The vented battery structure of claim 1, wherein the low pressure differential is on the order of about 1 psig.

5. The vented battery structure of claim 1, wherein the battery is a lithium ion polymer battery subject to low internal pressure gassing.

6. The vented battery structure of claim 1, wherein the second film layer is comprised of a polyester with a thickness of up to 5 mils.

7. The vented battery of claim 1, wherein the second film layer is stretched to provide said reseating.

8. The vented battery structure of claim 1, wherein the flexible container is comprised of a foil package.

* * * * *